(12) United States Patent
Gusberti et al.

(10) Patent No.: US 10,065,151 B2
(45) Date of Patent: Sep. 4, 2018

(54) METHODS FOR REMOVING CONTAMINANTS FROM GAS STREAMS

(71) Applicants: Ambrogio Gusberti, Munich (DE); Frank R. Fitch, Bedminster, NJ (US); Heinz-Dieter Obermeyer, Freising (DE)

(72) Inventors: Ambrogio Gusberti, Munich (DE); Frank R. Fitch, Bedminster, NJ (US); Heinz-Dieter Obermeyer, Freising (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 15/353,853

(22) Filed: Nov. 17, 2016

(65) Prior Publication Data

US 2017/0189852 A1    Jul. 6, 2017

Related U.S. Application Data

(60) Provisional application No. 62/270,311, filed on Dec. 21, 2015.

(51) Int. Cl.
| | | |
|---|---|---|
| *B01D 53/56* | (2006.01) | |
| *B01D 53/14* | (2006.01) | |
| *B01D 53/34* | (2006.01) | |
| *B01D 53/40* | (2006.01) | |
| *B01D 53/50* | (2006.01) | |
| *B01D 53/64* | (2006.01) | |

(Continued)

(52) U.S. Cl.
CPC ............. *B01D 53/56* (2013.01); *B01D 53/14* (2013.01); *B01D 53/75* (2013.01); *B01D 2251/104* (2013.01); *B01D 2252/103* (2013.01); *B01D 2257/404* (2013.01)

(58) Field of Classification Search
CPC .. B01D 53/56; B01D 53/14; B01D 2251/104; B01D 53/34; B01D 53/40; B01D 53/50; B01D 53/64; B01D 53/74; B01D 53/78; B01D 2257/302; B01D 2257/402; B01D 2257/404; B01D 2257/602; B01D 2258/0283
See application file for complete search history.

(56) References Cited

U.S. PATENT DOCUMENTS

| | | | |
|---|---|---|---|
| 5,206,002 | A | 4/1993 | Skelley et al. |
| 6,162,409 | A | 12/2000 | Skelley et al. |

(Continued)

FOREIGN PATENT DOCUMENTS

| | | | | |
|---|---|---|---|---|
| CA | 2927588 A1 | * | 4/2015 | ............. B01D 53/83 |
| CN | 103752151 A | | 4/2014 | |

(Continued)

*Primary Examiner* — Timothy C Vanoy
(74) *Attorney, Agent, or Firm* — Philip H. Von Neida (57) ABSTRACT

A method for the partial removal of contaminants such as nitrogen oxides from a process gas stream is described. The process gas stream is separated into at least two process gas streams by means of a partition, baffle, damper or other device. Ozone is fed into contact with at least one of the separated process gas streams to oxidize the contaminants therein and the at least one of the process gas streams contacted by ozone is fed to a scrubber for removal of the oxidized contaminants from the gas streams. The separation is proportional to the percentage removal of contaminants desired.

11 Claims, 7 Drawing Sheets

(51) Int. Cl.
    *B01D 53/74*     (2006.01)
    *B01D 53/78*     (2006.01)
    *B01D 53/75*     (2006.01)

(56) References Cited

U.S. PATENT DOCUMENTS

| | | |
|---|---|---|
| 6,649,132 B1 | 11/2003 | Hwang et al. |
| 7,303,735 B2 | 12/2007 | Suchak et al. |
| 8,865,098 B2 | 10/2014 | Suchak |
| 9,126,143 B2 * | 9/2015 | Xiong .................... B01D 53/60 |
| 2015/0044116 A1 | 2/2015 | Suchak |
| 2015/0267917 A1* | 9/2015 | Suchak .................. B01D 53/56 |
| | | 110/345 |

FOREIGN PATENT DOCUMENTS

| | | |
|---|---|---|
| CN | 204952626 U | 1/2016 |
| EP | 2719440 A1 | 4/2014 |
| JP | S5326267 A | 3/1978 |

\* cited by examiner

METHODS FOR REMOVING CONTAMINANTS FROM GAS STREAMS

CROSS REFERENCE TO RELATED APPLICATIONS

This application claims priority from U.S. Provisional Application Ser. No. 62/270,311 filed on Dec. 21, 2015.

BACKGROUND OF THE INVENTION

Combustion and chemical processes generally generate gas streams containing contaminants that need cleanup before being exhausted to the atmosphere. Many industrial processes, power generating utilities, combustion processes, stationary and mobile sources such as engines, boilers, kilns and the like use solid fuels or low cost hydrocarbon fuels that contain sulfur, chlorine, nitrogen and metal compounds in hydrocarbons which result in exhaust gases that contain contaminants such as acid gases, particulate matter and heavy metals. To comply with stricter environmental rules mandated by legislation and a greater concern for the environment, combinations of scrubbing (wet or dry) and particulate capture devices such as electrostatic precipitators (ESP), wet ESP and bag houses are increasingly utilized for emissions control of acid gas and particulate matters.

Nitrogen oxides found in most combustion exhaust streams primarily are in the form of nitric oxide (NO), which is nearly insoluble in water and not very reactive. Nitric oxide is not removed to any significant extent by most wet or dry scrubber capture devices. To control nitrogen oxide emissions, therefore, the two major options are to lower nitrogen oxide formation at the source by modifying combustion or secondly treating nitrogen oxides in the exhaust gas stream using post combustion techniques.

Primary techniques used for reducing nitrogen oxide formation by modifying combustion are low nitrogen oxides burner (LNB), flue gas recirculation (FGR), staged combustion and over fire air (OFA). In most applications these technologies are not adequate for removing nitrogen oxides from combustion gas streams and post combustion techniques, such as selective catalytic reduction (SCR) and selective non-catalytic reduction (SNCR), become necessary to achieve the desired nitrogen oxide reduction levels.

Both SCR and SNCR processes realize good results but also have limitations. Ozone based oxidation technologies have recently gained success as an alternative post combustion technique, especially when an application is not suitable for SCR. Ozone based processes as described in U.S. Pat. Nos. 6,162,409; 5,206,002; and 7,303,735 provide multi-pollutant removal approaches.

Coal fired boilers with low nitrogen oxides burners and staged combustion often attain nitrogen oxides levels in the range of 0.25 to 0.4 lb/MMBTU (one million British Thermal Units) cost effectively whereas regulations require nitrogen oxides emissions to be in the range of 0.1 to 0.15 lb/MMBTU.

The ozone based processes for oxidizing nitrogen oxides described in U.S. Pat. Nos. 5,206,002; 6,162,409; 6,649,132; and 7,303,735 are directed towards achieving high levels of nitrogen oxide removal (around 90%) and require the use of about 1.5 moles of ozone per mole of nitrogen oxide present in the exhaust gas stream. In the reaction time allowed in these methods, ozone reacts selectively with NOx forming higher oxides of nitrogen, especially the pentavalent form or higher which are very water soluble and readily removed by wet scrubbing. Configuring these processes to operate at lower levels of nitrogen oxide removal, however, causes both economic and process challenges.

The oxidation of NOx to $N_2O_5$ involves many reactions but for the sake of brevity, it can be simplified as follows:

$$NO + O_3 \rightarrow NO_2 + O_2 \qquad (1)$$

$$NO_2 + O_3 \rightarrow NO_3 + O_2 \qquad (2)$$

$$NO_2 + NO_3 \rightarrow N_2O_5 \qquad (3)$$

Reaction (1) is an order of magnitude faster than reaction (2). By the time reaction (2) starts to occur, most of the NO has already been oxidized to $NO_2$. At levels of NOx removal of 90% and higher the actual molar ratio of ozone to NOx removed that is required is close to the stoichiometric ratio indicated above. At low to moderate levels of NOx removal, however, not only is significantly more ozone required than the ideal stoichiometric amount, but also the NOx that is emitted from the stack is essentially in the form of the brown colored and acrid smelling $NO_2$.

U.S. Pat. No. 8,865,098 describes an ozone-based method for the partial removal of contaminants from a process gas stream that overcomes the economic and process limitations of the prior art ozone NOx oxidation processes.

In these methods the process gas stream containing contaminants is divided into at least two process gas streams. Ozone is injected into a selected one or more of the process gas streams for mixing of the ozone with the contaminants including nitrogen oxides. The nitrogen oxides in the selected process gas stream or streams are essentially fully oxidized by ozone. Then the ozone treated selected process gas stream or streams that are now substantially free of un-oxidized nitrogen oxides are recombined with the remaining process gas stream containing contaminants. The oxidized nitrogen oxides are removed by a capture device either from the selected process gas stream or streams prior to recombination with the remaining process gas stream containing contaminants, or after recombination of the gas streams.

Essentially 100% of the NOx in the selected gas stream or streams is thereby removed utilizing close to the stoichiometric molar ratio of ozone to NOx removed. No ozone is utilized oxidizing NO to $NO_2$ in the un-treated stream and the NOx released from the stack remains mainly colorless NO. Both deficiencies in the earlier ozone NOx removal methods at low to moderate levels of NOx removal are hence addressed. In addition, since any small degree of ozone slip resulting from the high level of oxidation targeted in the one or more oxidized selected gas streams is immediately quenched by very reactive NO on recombination with the untreated gas stream.

The overall fraction of NOx removed is about equal to the fraction of the overall process stream contained in the at least one selected process gas streams to which ozone is added. U.S. Pat. No. 8,865,098 focuses on instances where a fixed proportion of the total NOx must be removed, e.g. 50%, or where a series of different fractions of NOx should be removed, e.g. 25%, 50% and 75% for example to meet current and future regulatory needs. Various embodiments are described that cost effectively achieve this, including: placing fixed partitions into existing exhaust gas ducts and or scrubbers and injecting ozone into one or more or the separated streams; injecting ozone into one of more of multiple ducts containing the exhaust gas stream from a combustion or chemical source of NOx contamination; and, injecting ozone into one or more separate zones in a spray drier, or other air pollution control equipment, so that a fixed proportion of the exhaust gas is treated with ozone. These embodiments work well and economically if emission regulations require that a fixed percentage (e.g. 75%) of NOx be removed from a source with constant or varying NOx levels, or that a specified NOx level be maintained in the stack from a source with a roughly constant NOx level (for example an inlet NOx level of about 400 mg/Nm$^3$ be reduced to less than 100 mg/Nm$^3$: in which case 75% of the exhaust gas is treated with ozone and then the oxidized products scrubbed out).

However, in the case of a source that generates a variable NOx level and where regulations require that a fixed level of NOx be maintained in the stack, then these partial NOx removal ozone oxidation solutions are not ideal. The required fraction of NOx removed, and hence the required proportion of the total process gas that must be treated varies continuously between the minimum fraction required to reduce the lowest NOx input level to the regulatory limit and the maximum fraction required to reduce the highest NOx inlet level to the regulatory level, not in a series of fixed increments, e.g., 25%, 50% and 75%.

U.S. Pat. No. 8,865,098 teaches a partial solution to this problem in the embodiment described in column 11, line 39 to column 12, line 9 as well as FIG. 8. This constitutes the nearest prior art to the current invention. In this embodiment a fan driven by a variable frequency drive is used to divert a variable proportion of the process gas stream to an ozone oxidation duct and scrubber that removes the oxidized NOx and other contaminants present, if any.

It is not feasible to implement this particular solution in many real world applications because of space limitations, the geometry of the process flow duct (more particularly if the plant has multiple ducts), or because of the impact of the wide range of different fractions of the process flow diverted through the fan on the pressure drop, the ozone mixing efficiency and mixing time and the residence time for the ozone oxidation in the ozone oxidation duct as well as scrubber efficiency.

The present inventors have discovered a flexible ozone-based oxidation system that can remove and capture a variable partial fraction of the nitrogen oxides contained in an exhaust gas. This variability can be in response to the source of nitrogen oxides contamination that continuously or stepwise varies with fuel or other operational parameters such as furnace load or changes in the required stack nitrogen oxides level.

SUMMARY OF THE INVENTION

In one embodiment of the invention, there is disclosed a method for the partial removal of contaminants from a process gas stream comprising the steps of: separating a process gas stream into at least two process gas streams by means of a partition, baffle or damper, wherein a ratio of total flow rates of the process gas streams to be treated to a total flow rate of the process gas stream is variable and is proportional to the amount of contaminants that are removed, feeding ozone into contact with at least one of the separated process gas streams to oxidize the contaminants in the gas stream, and feeding at least one of the process gas streams contacted by ozone to a scrubber for removal of the oxidized contaminants from the gas streams.

This invention provides a cost effective solution for the removal of variable amounts of NOx from a combustion or chemical sourced process stream, utilizing close to the stoichiometric ratio of ozone to NOx removed, for all fractions of NOx that need to be removed, without increase in the levels of NO$_2$ emitted in the stack or issues with ozone slip.

It provides a flexible ozone-based oxidation system that can cost effectively remove and capture a variable partial fraction of the NOx contained in the exhaust gas from a source in response to either a source of NOx contamination that continuously or step-wise varies with fuel or other operational parameters, such as furnace load, or to planned or seasonal changes in the required stack NOx level.

The present invention can be compared and contrasted with a generalized but similar NOx removal opportunity and comparable results can be obtained versus these earlier ozone oxidation methods for NOx removal and capture. A feed stream containing 100 Kg/hr of NOx is to be treated. As is normal in industrial practice the NOx levels are reported as NO$_2$ although typical NOx sources from combustion processes comprise 90-95% NO. In this case the NOx is assumed to be 100% NO for simplicity. The ozone oxidation processes of U.S. Pat. Nos. 6,162,409, 5,206,002 and 7,303,735 (hereafter referred to as conventional LoTOx), U.S. Pat. No. 8,865,098 (hereafter referred to as fixed treatment) and the current invention (hereafter referred to as variable treatment) are compared and contrasted.

Figure 1:
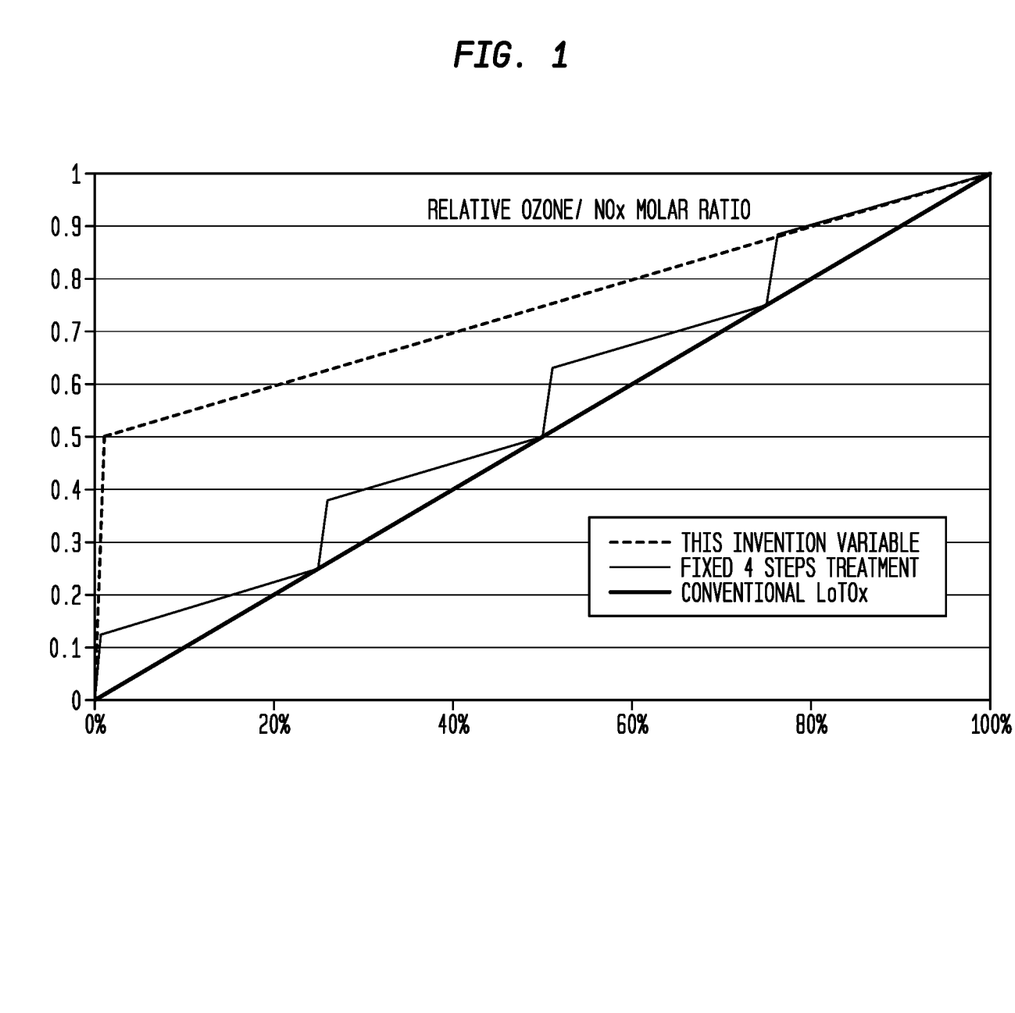
FIG. 1 is a chart showing the fractional amount of nitrogen oxides removed versus the amount of ozone employed for various processes.

FIG. 1 shows the ozone to NOx molar ratios for these different processes as a function of the required NOx removal level, 0 to 100, relative to the stoichiometric ozone to NOx removal ratio at 100% NOx removal. In real industrial situations, additional margin would be required to account for non-ideal flow distribution, mixing, temperature, pressure, other contaminants, etc.

As can been clearly seen from FIG. 1, conventional LoTOx, utilizes significantly more ozone than does the current invention, variable treatment especially at low and intermediate levels of NOx removal. In addition, the residual NOx emitted from conventional LoTOx is essentially fully converted to NO$_2$, whereas in the case of variable treatment it remains as the lower environmental impact NO.

Fixed treatment is in part able to solve the issues of conventional LoTOx at low and moderate NOx removal levels, but because of the restrictions imposed by the fixed partitions or selection of one or more of multiple exhaust streams for ozone treatment and NOx removal, then this solution has sweet spots of ozone usage at the removal levels corresponding to the fractions of the flow treated in the selected process gas streams, in this case 25%, 50%, 75% (and 100%). In order to prevent the formation of residual NO$_2$ it is necessary to fully treat 25%, 50%, 75% or 100% of the flow, even when intermediate levels of NOx removal are required. If 66% removal of NOx is required, then 75% of the NOx should be removed in this example, to ensure that additional residual NO$_2$ is not generated, thus requiring more ozone to be used than in the ideal variable treatment case. This leads to the stepwise nature of the curve for fixed treatment in FIG. 1.

The contaminants contained in the process gas stream for treatment are selected from the group consisting of nitrogen oxides, sulfur oxides, acid gases, particulate matter and mercury. The nitrogen oxides treated are selected from the group consisting of nitric oxide and nitrogen dioxide. The process gas stream is an exhaust gas stream from an industrial process, typically from a source selected from the group consisting of fixed sources and mobile sources. The industrial process is selected from the group consisting of industrial boilers, power generation systems, chemical processing, kilns, furnaces and combustion processes.

The separating mechanism can be a variable speed blower which is used to divert a variable portion of the process gas stream to either the treated or untreated gas streams.

The creation of the divergence in the streams allows for an additional reaction chamber to be added to the process gas streams that are to be treated with ozone.

The scrubber is typically selected from the group consisting of dry, semi-dry and wet scrubbing equipment. The amount of ozone that is added to the at least one of the two or more separated gas stream is an amount of greater stoichiometry than the amount of nitrogen oxides present therein.

BRIEF DESCRIPTION OF THE DRAWINGS

FIGS. 3.1, 3.2, 3.3 and 3.4 are schematics of raw gas treatment systems.

DETAILED DESCRIPTION OF THE INVENTION

FIG. 1 depicts a comparison of several techniques for treating gas streams for nitrogen oxides removal using ozone. Pursuant to the invention, an ozone based oxidation solution for the removal of NOx from process streams is shown as the straight diagonal line from 0% to 100%.

As discussed previously, if the gas stream containing the nitrogen oxides contaminants is divided into 4 equal parts, then this provides a good solution for the removal of 25%, 50%, 75% or 100% of the NOx, but may be less effective for intermediate NOx removal levels.

Figure 2A:
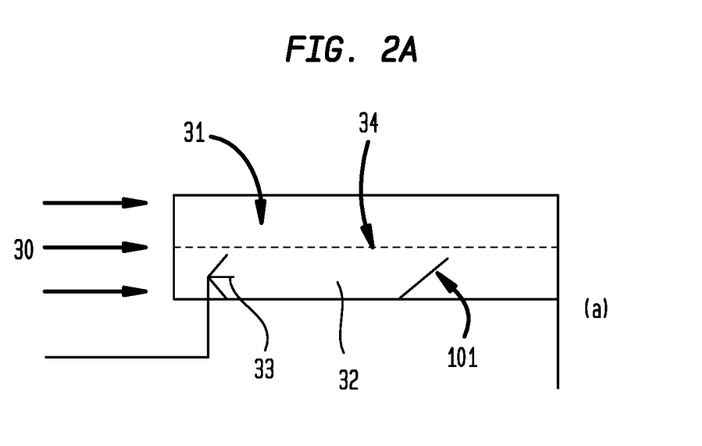
FIGS. 2(a) through 2(e) are schematics of embodiments of the present invention showing different mechanisms for dividing the stream to be treated.
Figure 2B:
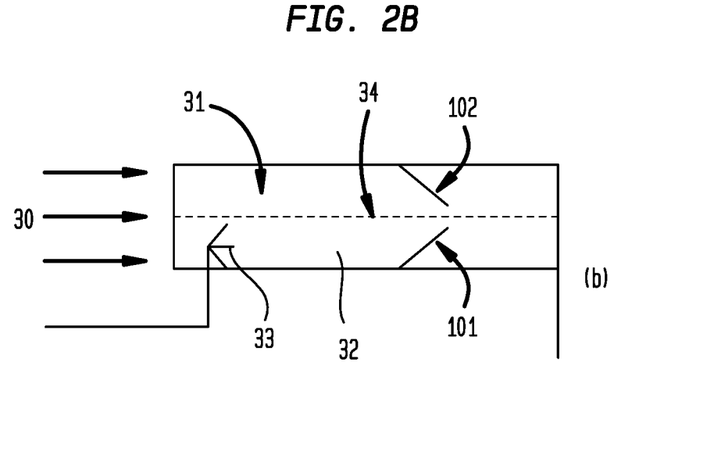

FIGS. 2(a) and 2(b) show how this design may be modified in accordance with the current invention by the addition of variable dampers in one or more of the gas streams, that allow the fraction of gas being treated to be varied between the minimum level required and the maximum level required.

For purposes of the description of drawing FIGS. 2(a), 2(b), 2(c), 2(d) and 2(e) there may be certain numbers that are used to describe the same element amongst them.

In FIG. 2(a), the process gas stream 30 that contains the contaminants such as the nitrogen oxides is fed into the fixed treatment zone (a). Two zones are created 31 and 32 by means of partition 34. The flow of the process gas stream is uninterrupted in zone 31 but in stream 32 is moderated by a variable damper 101 which will create essentially two streams with different flows. Ozone is injected into stream 32 by means of ozone injection grid 33. The fraction of the total flow through 32 is selected to correspond with the fraction of the total NOx that needs to be removed. As drawn, FIG. 2(a) shows solutions corresponding to the current invention where it is desired to remove less than or equal to about 50% of the nitrogen oxides present in the original process gas stream 30. If greater or smaller fractions of NOx need efficiently to be removed, then the partition 34 (or more than one partition) are placed such that the relative flow rates through streams 31 and 32 are optimum for the range of NOx removal level required.

In FIG. 2(b), the process gas stream 30 is again divided into two zones 31 and 32 by partition 34 in the fixed treatment zone (b). Like FIG. 2(a) described above, ozone injection grid 33 and variable damper 101 are present in zone 32, however an additional variable damper or baffle 102 is added to zone 31. This additional damper or baffle will alter the fluid dynamics in zone 31 thereby allowing the flow in zone 32 to be optimized to achieve the necessary residence time and other variables needed to allow for treatment of NOx in this process stream.

The dampers may be single vanes that can restrict the flow of gas in one of more of the gas streams, or comprise multiple louvers. Additional baffles, flow straighteners, static mixers, etc, may be required in order to ensure good flow distribution and that the mixing of ozone is optimized in these designs. Computational fluid dynamics code is commonly used to optimize these factors.

The damper may be automatically controlled to respond to continuous changes in the NOx removal requirement or adjusted manually, for example with a screw gear, to allow adjustments to be made to different fuels burned or different regulatory demands.

Figure 2C:
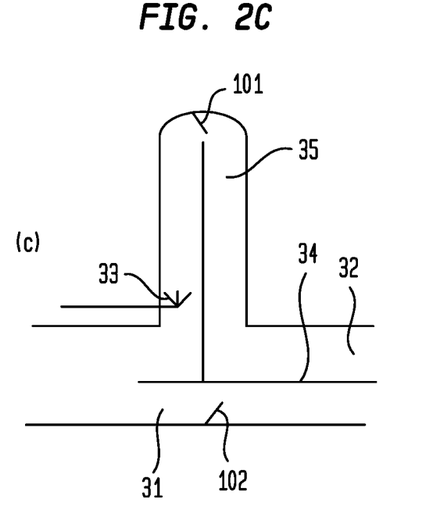

If there is insufficient residence time for the ozone oxidation to be completed in the duct selected for this purpose, then an additional oxidation reactor may be required. FIG. 2(c) shows one such embodiment of the current invention. Again dampers may be placed in one or more of both the untreated and treated gas streams in order to control the split of treated and untreated process gas in response to varying NOx removal requirements.

In FIG. 2(c), the feed gas stream 30 containing the contaminants is again divided into two zones 31 and 32 by means of partition 34 as described above. Variable damper or baffle 102 is again present in zone 31. However the volume of zone 32 has been expanded into a larger fixed treatment zone (c) in order to achieve sufficient residence time for the reaction of ozone with NOx to proceed to completion. Ozone injection grid 33 and one or more variable dampers 101 are situated in zone 32. The additional reaction zone in 32 is depicted in FIG. 2(c) as a square or circular cross section vessel, with a partition along its axis 35 that forces the ozone treated stream to flow first in one direction, pass the variable damper 101, and then in the opposite direction back towards partition 34, thus increasing the residence time in zone 32 versus that in zone 31. it should be understood, that the addition reaction zone can be configured in many other geometries and orientations, such as for example a curved or serpentine tube.

Figure 2D:
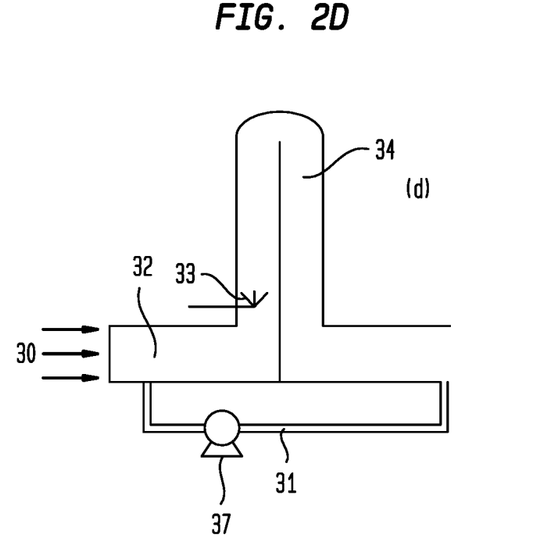

An alternative embodiment is shown in FIG. 2(d) in which a variable speed drive is used with a fan to divert the calculated fraction of process gas that is not to be treated with ozone. The reactor is sized so that the residence time is sufficient for complete reaction of the ozone with NOx for both the minimum and maximum fractions of NOx that need to be removed. The ozone injection grid and flow diversion elements are designed to ensure rapid and complete mixing of ozone into the process gas stream. If necessary multiple by-pass streams or multiple reactors can be utilized to keep the flows within optimal conditions.

In FIG. 2(d), the feed gas stream 30 containing the contaminants is again divided into two zones 31 and 32 by means of partition 34 as described above. Zone 32 is sized to increase the residence time for complete reaction of the ozone with the nitrogen oxides is achieved. Ozone injection grid 33 is situated in zone 32. The additional reaction zone in 32 is depicted in FIG. 2(d) is equivalent of that depicted in FIG. 2(c). A fan 37 is employed to divert a portion of the feed gas stream 30 into zone 31 such that a certain percentage as determined by the operator is diverted from the treatment zone wherein the ozone reacts with the nitrogen oxides present in the feed gas stream.

Figure 2E:
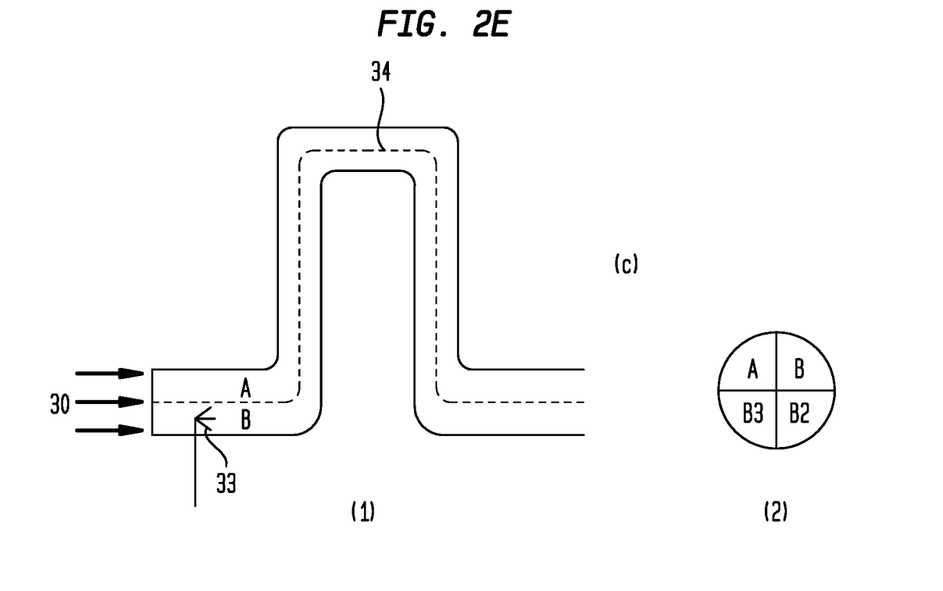

If conversion levels up to 100% are required, then sufficient residence time is needed for complete ozone reaction with NOx in all of the separated flow channels. FIG. 2(e) depicts such an embodiment. In this case variable dampers are placed within flow streams A, B, B1 and B2 that allow selection of the required flows within each flow element in order to achieve the desired range of NOx removal levels.

The fixed treatment zone (e) is shown in both a sideways view (1) and a cross sectional view (2). The sideways view 1 shows the creation of two sets of zones A and B by means of partition or partitions 34. where ozone injection grid or grids 33 and variable dampers 101 are present in each individual zone B. The cross sectional view shows that dividing line 34 is in the shape of a cross which actually creates four zones A, B, B3 and B2 in the fixed treatment zone (e) such that the operator can divert various amounts of the feed gas stream for treatment by the addition of ozone. This allows, not only for NOx removal levels of 25%, 50%, 75% and 100% (if an injection grid 33 is added in zone A), but by adjusting the appropriate dampers for levels from about 0% to 25%, about 25% to 50%, about 50% to 75%, and if both an injection grid and a variable damper 101 are added to zone A, from about 75% to 100%, by means of adjustment of the appropriate damper or dampers.

FIGS. 3.1, 3.2, 3.3 and 3.4 show examples of various raw gas treating schemes. They show placement of fans, fixed reaction zones and related process details.

The ozone can either be injected before or after the fan depending on the oxygen/ozone concentration, on the humidity level and on the construction material of the elements in touch with the process gases. To inject before the fan will allow to the operator to lower the residence time.

FIGS. 3.1 to 3.4 represent various raw gas treatment systems that could incorporate the fixed treatment zone design described with respect to FIGS. 2(a) to 2(e). In FIG. 3.1, raw process feed gas is fed from source AA through line 100 to the fixed treatment zone CC. Ozone which can be produced from a typical ozone generator is fed to the fixed treatment zone through line 101 typically up to 12% by volume ozone to feed gas stream. The ozone will react with the nitrogen oxides in the feed gas stream and the reaction products will be fed through line 102 to a fan, where M indicates a motor, which will direct the oxidized process gas to an aqueous scrubber assembly DD where these reactants will be absorbed in the water and the feed gas stream could be released to the environment without nitrogen oxides present therein.

Figure 31:
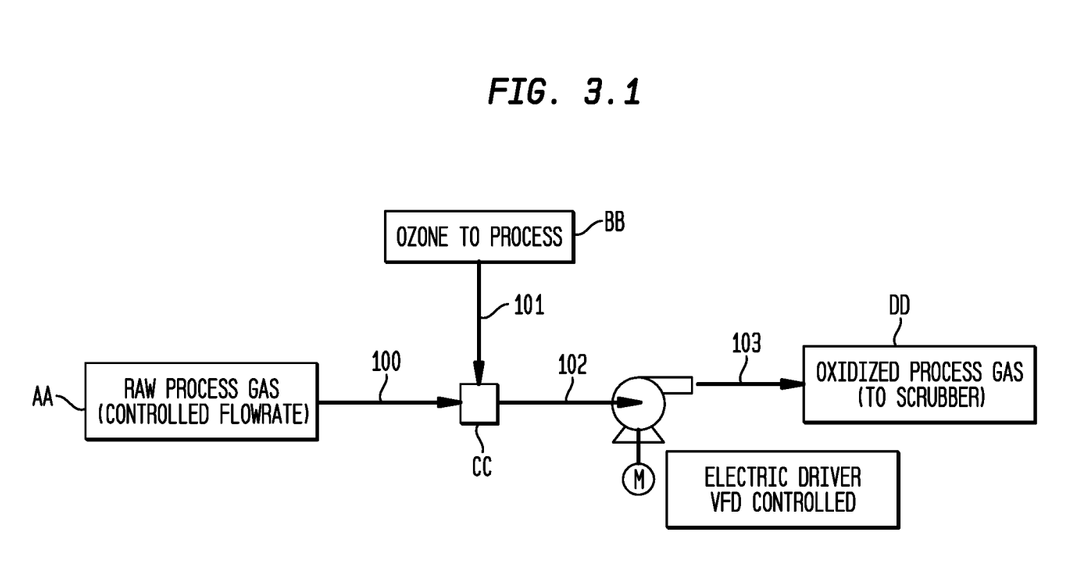
Figure 32:
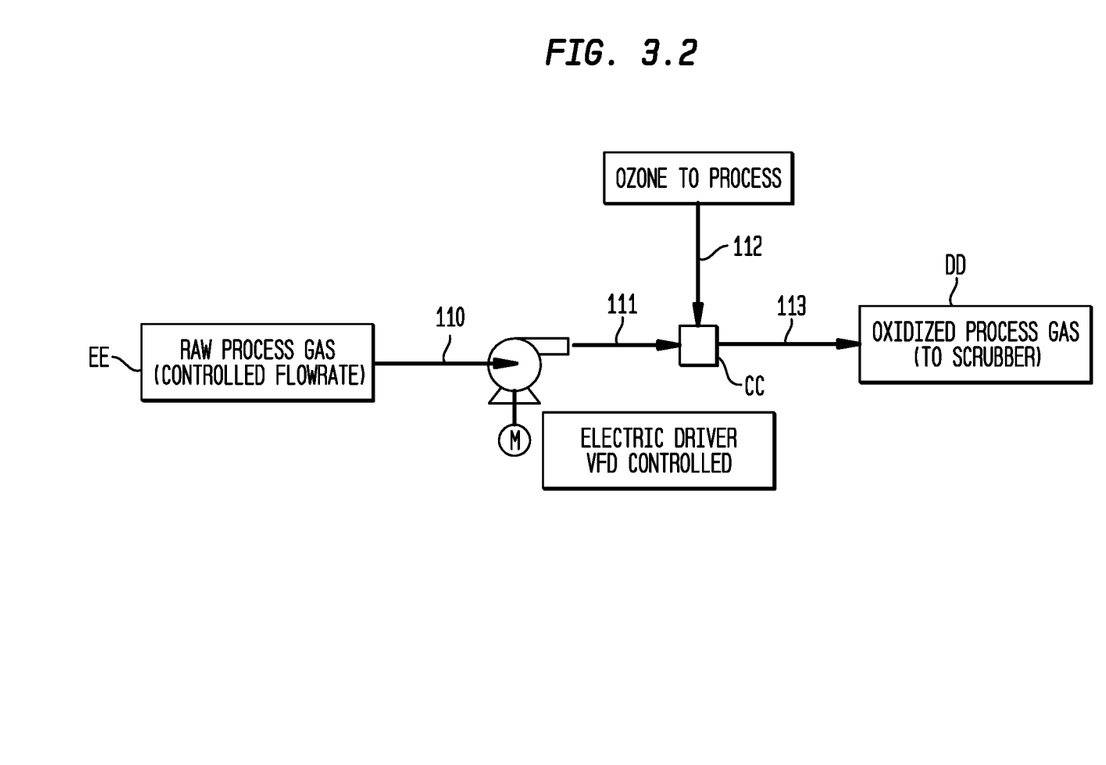

In FIG. 3.2, the fan is placed before the fixed treatment zone CC. The feed gas stream containing nitrogen oxides is sourced from EE and fed through line 110 to the fan M which will deliver the feed gas stream containing nitrogen oxides to the fixed treatment zone CC through line 111. Ozone as described in FIG. 3.1 is fed through line 112 to the fixed treatment zone CC where it will react with the nitrogen oxides. The reaction products are fed through line 113 to scrubber assembly DD where these reactants will be absorbed by the water and the feed gas stream free of nitrogen oxides will be released to the environment.

Figure 33:
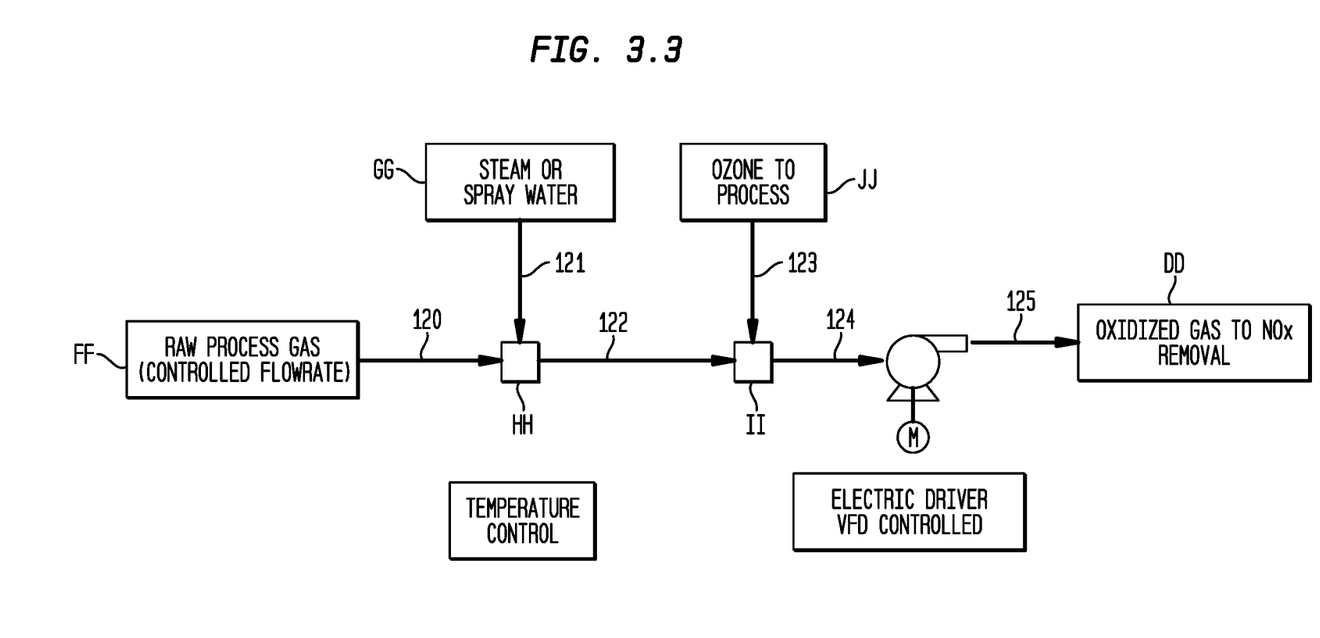

In FIG. 3.3, there are two fixed treatment zones HH and II. The feed gas stream containing nitrogen oxides contaminants is fed from the source such as an industrial process exhaust FF through line 120 to the first fixed treatments zone HH. There, steam or spray water is fed through line 121 to the fixed treatments zone HH thereby to increase or reduce the temperature of the feed gas stream which is then fed through line 122 to the second fixed treatment zone II. The ozone from an ozone generator JJ as described above is fed through line 123 to the second fixed treatment zone II where the ozone will react with the nitrogen oxides. This stream is then fed through line 124 through a fan to line 125 and on to a device such as a scrubber DD where the oxidized reactants can be removed from the feed gas stream.

Figure 34:
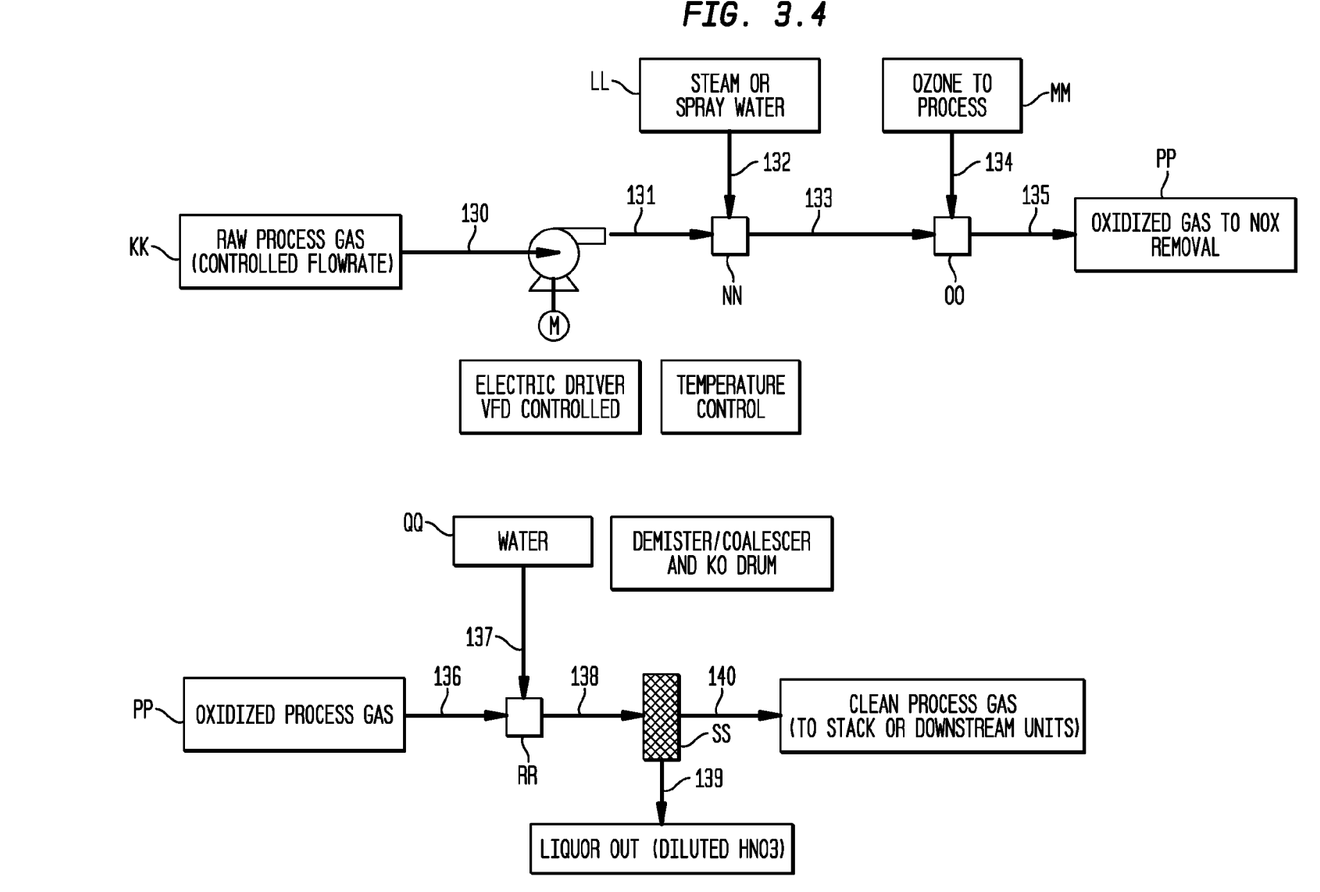

In FIG. 3.4, there is a two step process shown. The feed gas stream containing nitrogen oxides is fed from the industrial source KK through line 130 where a fan will direct the feed gas stream through line 131 to a first fixed treatment zone NN. There steam or spray water from source LL will be fed through line 132 to the first fixed treatment zone NN to raise or reduce the temperature of the feed gas stream. This adjusted feed gas stream is then fed to second fixed treatment zone OO through line 133. There ozone will be fed from an ozone generator MM as described above through line 134 to the second fixed treatment zone OO where the nitrogen oxides will be oxidized. These oxidized reactants will be fed through line 135 and 136 to a further treatment such as an aqueous scrubber.

In the scrubber RR where water will be fed from a source QQ through line 137 the reactants are contacted with water. The resultant gas water mixture is fed through line 138 to a demister/coalescer and knockout drum SS. The oxidized reactants will absorb in the water and form a dilute nitric acid solution which can be removed from the demister/coalescer and knockout drum SS through line 139. The gas stream now free of contaminants is fed through line 140 and recovered for further treatment or released into the atmosphere in an environmentally responsible manner.

In FIG. 3.4, a nitrogen oxides absorption system is shown. The principle is to control the temperature via steam injection or demiwater spray. In both cases the water added to the system is then removed in the next phase where the coalescer collects the excess of water in the system. In some situations the second injection of water may also not be needed, in particular when the humidity into the system is high enough to provide the system with the required amount of liquid to remove the $N_2O_5$.

If the ozone treated and untreated streams are recombined and then the combined stream is treated with the selected Air Pollution control equipment, for example a wet, dry or semi-dry scrubber, then the selected fraction of NOx is removed together with other contaminants, if any, in this additional device.

If the ozone-oxidized stream is fed through an air pollution control device prior to mixing with the untreated stream, then the selected fraction of NOx as well as the same fraction of other contaminants, if any, may be removed.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for the partial removal of contaminants from a process gas stream comprising the steps of: separating a process gas stream into at least three process gas streams by means of a separating mechanism, wherein the process gas stream is heated before separating wherein a ratio of total flow rates of the at least three process gas streams to a total flow rate of the process gas stream is variable and is proportional to an amount of contaminants that are to be removed from the at least three process gas streams, feeding ozone into contact with at least one of the at least three process gas streams to oxidize the contaminants in the gas stream, and feeding at least one of the at least three process gas streams contacted by ozone to a scrubber for removal of the oxidized contaminants from the at least three process gas streams wherein an additional reaction chamber is provided for at least one of the at least three process gas streams that are treated with ozone.

2. The method as claimed in claim 1 wherein the separating mechanism is selected from the group consisting of a partition, baffle and variable damper.

3. The method as claimed in claim 1 wherein the separating mechanism is a variable speed blower and is used to divert a variable portion of the process gas stream to either a treated or an untreated stream.

4. The method as claimed in claim 3 wherein a reaction zone is enlarged to provide for more residence time.

5. The method as claimed in claim 1 wherein the contaminants are selected from the group consisting of nitrogen oxides, sulfur oxides, acid gases, particulate matter and mercury.

6. The method as claimed in claim 1 wherein the process gas stream is an exhaust gas stream from an industrial process selected from the group consisting of industrial boilers, power generation systems, chemical processing, kilns, furnace sand combustion processes.

7. The method as claimed in claim 1 wherein the at least three process gas streams are separated proportionally based on the amount of contaminants removal desired.

8. The method as claimed in claim 1 wherein the scrubber is selected from the group consisting of dry, semi-dry and wet scrubbing equipment.

9. The method as claimed in claim 1 wherein the amount of ozone that is added to the at least one of the three process gas streams is an amount of greater stoichiometry than the amount of nitrogen oxides present in the at least one of the three process gas streams.

10. The method as claimed in claim 1 wherein at least one of the process gas streams is not treated with ozone.

11. The method as claimed in claim 1 further comprising feeding the at least one process gas stream treated with ozone to a fan.

* * * * *